(12) United States Patent
Lee

(10) Patent No.: US 11,720,093 B2
(45) Date of Patent: Aug. 8, 2023

(54) METHOD FOR PREDICTIVE MAINTENANCE OF EQUIPMENT VIA DISTRIBUTION CHART

(71) Applicant: ITS CO., LTD., Ulsan (KR)

(72) Inventor: Young Kyu Lee, Ulsan (KR)

(73) Assignee: ITS CO., LTD., Ulsan (KR)

(*) Notice: Subject to any disclaimer, the term of this patent is extended or adjusted under 35 U.S.C. 154(b) by 0 days.

(21) Appl. No.: 17/769,653

(22) PCT Filed: Oct. 14, 2020

(86) PCT No.: PCT/KR2020/014026
§ 371 (c)(1),
(2) Date: Apr. 15, 2022

(87) PCT Pub. No.: WO2021/075855
PCT Pub. Date: Apr. 22, 2021

(65) Prior Publication Data
US 2023/0060002 A1    Feb. 23, 2023

(30) Foreign Application Priority Data

Oct. 15, 2019    (KR) .................. 10-2019-0128096

(51) Int. Cl.
*G05B 23/02*    (2006.01)
(52) U.S. Cl.
CPC ..... *G05B 23/0283* (2013.01); *G05B 23/0221* (2013.01); *G05B 23/0235* (2013.01)
(58) Field of Classification Search
CPC ............ G05B 23/0283; G05B 23/0259; G05B 23/0205; G05B 23/02; G05B 23/00;
(Continued)

(56) References Cited

U.S. PATENT DOCUMENTS 10,725,463 B1 *   7/2020   Dixit .................. B64D 45/00
10,732,619 B2     8/2020   Lee
(Continued)

FOREIGN PATENT DOCUMENTS

JP    2000259222 A    9/2000
JP    2001052221 A    2/2001
(Continued)

OTHER PUBLICATIONS

Notice of Reasons for Refusal cited in Japanese patent application No. 2022-523045; dated Nov. 22, 2022; 4 pp.
(Continued)

*Primary Examiner* — Mohamed Charioui
(74) *Attorney, Agent, or Firm* — Lempia Summerfield Katz LLC

(57) ABSTRACT

A method for predictive maintenance of equipment via a distribution chart is disclosed. Peak values are extracted based on a change in an amount of energy required for performing a work process by the equipment in a normal state, a distribution chart of the extracted peak values is constructed, and an abnormal symptom of the equipment is predictively detected in advance based on a change in distribution probability of a detection section having a low distribution probability and somewhat high risk in the constructed distribution chart thereof such that maintenance and replacement of the equipment are induced to be carried out at an appropriate time. Thus, an enormous monetary loss caused by a failure in the equipment may be prevented in advance.

3 Claims, 11 Drawing Sheets

Figure 1:
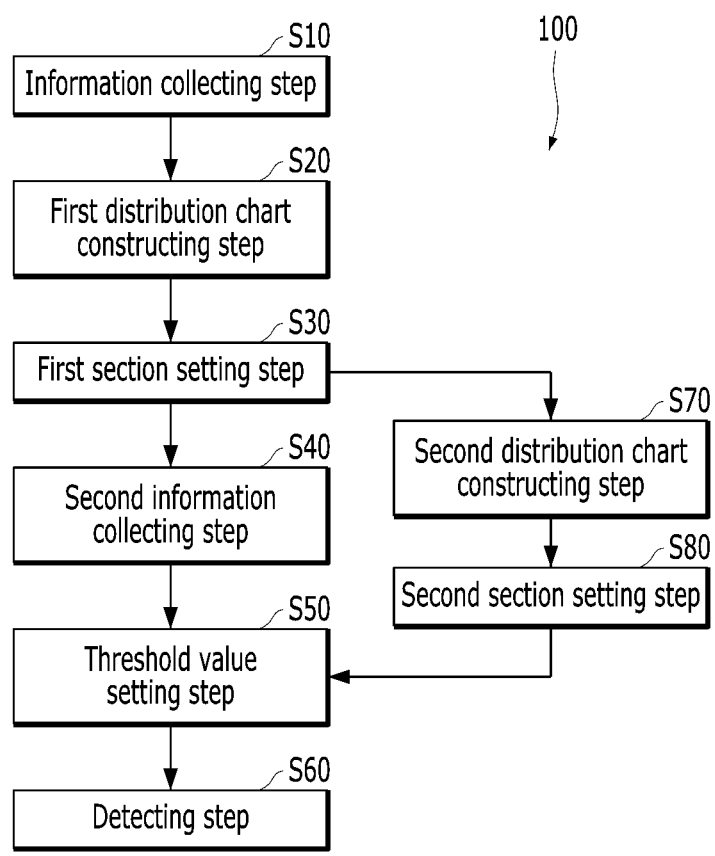

(58) Field of Classification Search
CPC ............ G05B 23/0221; G05B 23/0218; G05B 23/0235; G05B 23/0227; G05B 23/024
See application file for complete search history.

(56) References Cited

U.S. PATENT DOCUMENTS

| | | | |
|---|---|---|---|
| 10,838,938 B2 | 11/2020 | Niina et al. | |
| 11,049,335 B2 | 6/2021 | Lee | |
| 11,162,837 B2* | 11/2021 | Pal | G01H 1/003 |
| 11,222,520 B2 | 1/2022 | Lee | |
| 2008/0052039 A1* | 2/2008 | Miller | G05B 17/02 |
| | | | 702/182 |
| 2011/0025517 A1 | 2/2011 | Kobayashi et al. | |
| 2012/0316835 A1* | 12/2012 | Maeda | G06F 18/21375 |
| | | | 702/183 |
| 2014/0201571 A1* | 7/2014 | Hosek | G06F 11/2257 |
| | | | 714/26 |
| 2017/0262480 A1 | 9/2017 | Niia et al. | |
| 2018/0203440 A1 | 7/2018 | Lee | |
| 2020/0074833 A1 | 3/2020 | Lee | |
| 2020/0410780 A1 | 12/2020 | Lee | |

FOREIGN PATENT DOCUMENTS

| | | |
|---|---|---|
| JP | 2002304207 A | 10/2002 |
| JP | 2003259468 A | 9/2003 |
| JP | 2011036003 A | 2/2011 |
| JP | 2015030240 A | 2/2015 |
| JP | 2016040072 A | 3/2016 |
| JP | 2017162252 A | 9/2017 |
| JP | 2020520016 A | 7/2020 |
| KR | 101643599 B1 | 7/2016 |
| KR | 20190108266 A | 9/2019 |
| KR | 20190108270 A | 9/2019 |

OTHER PUBLICATIONS

International Search Report and Written Opinion cited in corresponding international application No. PCT/KR2020/014026; dated Feb. 16, 2021; 10 pp.

* cited by examiner

METHOD FOR PREDICTIVE MAINTENANCE OF EQUIPMENT VIA DISTRIBUTION CHART

CROSS-REFERENCE TO RELATED APPLICATIONS

This application is a U.S. national stage of International Patent Application No. PCT/KR2020/014026, filed Oct. 14, 2020, which claims priority to and the benefit of Korean Patent Application 10-2019-0128096, filed Oct. 15, 2019, the entirety of each of which is incorporated herein by reference.

FIELD

The present disclosure relates to a method for predictive maintenance of equipment via a distribution chart. More specifically, the present disclosure relates to a method for predictive maintenance of equipment performed via a distribution chart. In this method, peak values are extracted based on a change in an amount of energy required for performing a work process by the equipment in a normal state; a distribution chart of the extracted peak values is constructed; and an abnormal symptom of the equipment is predictively detected in advance based on a change in distribution probability of a detection section having a low distribution probability and somewhat high risk in the constructed distribution chart thereof such that maintenance and replacement of the equipment are induced to be carried out at an appropriate time. By the method, an enormous monetary loss caused by a failure in the equipment may be prevented in advance.

BACKGROUND

The statements in this section merely provide background information related to the present disclosure and may not constitute prior art.

In general, in the case of various equipment used for an automated process of a facility, a stable operation is very important.

For example, hundreds of equipment are installed in the facilities of a large-scale production plant to continuously produce products while interlocking with each other. If any one of a plurality of equipment has a malfunction, an enormous situation may occur in which an operation of the facility is stopped as a whole.

At this time, due to the occurrence of down time due to the malfunction of the equipment, a huge loss is caused by not only the repair cost of the equipment, but also operating costs wasted while the facility is stopped and business is also affected.

According to recent data from the Ministry of Employment and Labor and the Korea Occupational Safety and Management Agency, casualties caused by the annual industrial safety accidents were collected at a total of 100,000, and a loss of 18 trillion won annually occurs when converting the casualties into costs.

As a method for avoiding such unexpected downtime costs, it is urgent to introduce a predictive maintenance system. There are efforts to improve the problem under the name of predictive maintenance, but it is necessary to develop higher predictive maintenance methods for more efficient predictive maintenance.

SUMMARY

The present disclosure provides a method for predictive maintenance of equipment performed via a distribution chart. In the method, peak values are extracted based on a change in an amount of energy required for performing a work process by the equipment in a normal state; a distribution chart of the extracted peak values is constructed; and an abnormal symptom of the equipment is predictively detected in advance based on a change in distribution probability of a detection section having a low distribution probability and somewhat high risk in the constructed distribution chart thereof such that maintenance and replacement of the equipment are induced to be carried out at an appropriate time. By the method, an enormous monetary loss caused by a failure in the equipment may be prevented in advance.

Further, the present disclosure also provides a method for predictive maintenance of equipment via a distribution chart. The method presents various detection conditions to efficiently search for an abnormal symptom, which occurs in the equipment, and detects the equipment in an abnormal state when the detection condition is satisfied. By the method, the abnormal symptom, which occurs in the equipment, may be precisely and effectively detected and excellent reliability for a detection result may be secured.

In order to achieve the object, a method for predictive maintenance of equipment via a distribution chart according to the present disclosure includes a first information collecting step (S10) of measuring information in which the amount of energy required for the equipment to perform one working process in a normal driving state is changed according to the flow of time, and setting and collecting a value having a largest amount of energy as a peak value in the change information of the measured amount of energy. The method also includes a first distribution chart constructing step (S20) of collecting all peak values for respective working processes repeatedly performed in the equipment based on the information collected in the information collecting step (S10), constructing a first distribution chart based on the collected peak value, and repeatedly constructing the first distribution chart for an operation repeatedly performed in the equipment at a set peak unit time interval. The method also includes a first section setting step (S30) of arbitrarily setting a section in which a distribution probability of the peak value is high as a peak average section in the first distribution chart, and setting any one section or two or more sections selected among sections other than the set peak average section as a peak detection section. The method also includes a second information collecting step (S40) of arranging the distribution probability values for the peak detection section of the first distribution chart repeatedly collected in the first information collecting step (S10), the first distribution chart constructing step (S20), and the first section setting step (S30) according to the flow of the time, and connecting the arranged distribution probability values of the peak detection section to each other by straight lines, and then collecting peak slope information through slopes of the straight lines. The method also includes a threshold value setting step (S50) of setting a threshold value of a peak slope for the peak detection section. The method also includes a detecting step (S60) of arranging the distribution probability values for the peak detection section of the first distribution chart repeatedly collected in the real-time driving state of the equipment and connecting the arranged distribution probability values of the peak detection section to each other by the straight lines to measure a peak slope value, and when the measured peak slope value exceeds the threshold value of the peak slope, inducing an inspection and management of the equipment by warning, and the peak unit time is set as a time including two or more working processes.

Further, the method further includes a second distribution chart constructing step (S70). In this step, all of the distribution probabilities for the peak detection section of the first distribution chart repeatedly collected through the information collecting step (S10), the first distribution chart constructing step (S20), and the first section setting step (S30) are collected, a second distribution chart for the collected distribution probability values of the peak detection section is constructed, and the second distribution chart for the peak detection section of the first distribution chart repeatedly constructed at the set distribution unit time interval is repeatedly constructed. The method further includes a second section setting step (S80). In this step, a section in which the distribution probability of the distribution probability value of the peak detection section is high is arbitrarily set as a distribution average section in the second distribution chart, and any one section or two or more sections selected among sections other than the set distribution average section are set as a distribution detection section. In the threshold value setting step (S50), the threshold value for the distribution slope for the distribution detection section is set. In the detecting step (S60), the distribution probability values for the distribution detection section of the second distribution chart repeatedly collected in the real-time driving state of the equipment are arranged according to the flow of the time, the arranged distribution probability values of the distribution detection section are connected to each other by the straight line to measure the distribution slope value, and when the measured distribution slope value exceeds the threshold value of the distribution slope, the inspection and management of the equipment are induced by warning, and the distribution unit time is set as a time including two or more first distribution charts.

Further, in the threshold value setting step (S50), each of a threshold value of a peak average slope for the peak detection section and a threshold value of a distribution average slope for the distribution detection section is set. In the detecting step (S60), when a peak average detection section including the peak slope value for the peak detection section twice or more in the real-time driving state of the equipment is set, the respective peak slope values included in the set peak average detection section are collected, and the averaged peak average slope value exceeds the threshold value of the peak average slope. Alternatively, when a distribution average detection section including the distribution slope value for the distribution detection section twice or more in the real-time driving state of the equipment is set, the respective distribution slope values included in the set distribution average detection section are collected, and the averaged distribution average slope value exceeds the threshold value of the distribution average slope, the inspection and management of the equipment are induced by warning.

By a method for predictive maintenance of equipment performed via a distribution chart according to the present disclosure, there is an effect that peak values are extracted based on a change in an amount of energy required for performing a work process by the equipment in a normal state; a distribution chart of the extracted peak values is constructed; and an abnormal symptom of the equipment is predictively detected in advance based on a change in distribution probability of a detection section having a low distribution probability and somewhat high risk in the constructed distribution chart thereof such that maintenance and replacement of the equipment are induced to be carried out at an appropriate time. By this method, an enormous monetary loss caused by a failure in the equipment may be prevented in advance.

Further, there is an effect that various detection conditions are presented to efficiently search for an abnormal symptom, which occurs in the equipment, and the equipment in an abnormal state is detected when the detection condition is satisfied. Thus, the abnormal symptom, which occurs in the equipment, may be precisely and effectively detected and excellent reliability for a detection result may be secured.

DRAWINGS

In order that the disclosure may be well understood, there will now be described various forms thereof, given by way of example, reference being made to the accompanying drawings, in which:

FIG. 1 is a block diagram of a method for predictive maintenance of equipment via a distribution chart according to an embodiment of the present disclosure; and FIGS. 2-11 are diagrams for describing the method for predictive maintenance of equipment via a distribution chart illustrated in FIG. 1.

DESCRIPTION OF MAIN REFERENCE NUMERALS OF DRAWINGS

S10: Information collecting step
S20 First distribution chart constructing step
S30: First section setting step
S40: Second information collecting step
S50: Threshold value setting step
S60: Detecting step
S70: Second distribution chart constructing step
S80: Second section setting step
100: Method for predictive maintenance of equipment via distribution chart

DETAILED DESCRIPTION

A method for predictive maintenance of equipment via a distribution chart includes an information collecting step (S10) of measuring information in which the amount of energy required for the equipment to perform one working process in a normal driving state is changed according to the flow of time, and setting and collecting a value having a largest amount of energy as a peak value in the change information of the measured amount of energy. The method also includes a first distribution chart constructing step (S20) of collecting all peak values for respective working processes repeatedly performed in the equipment based on the information collected in the information collecting step (S10), and constructing a first distribution chart based on the collected peak value, and repeatedly constructing the first distribution chart for an operation repeatedly performed in the equipment at a set peak unit time interval. The method also includes a first section setting step (S30) of arbitrarily setting a section in which a distribution probability of the peak value is high as a peak average section in the first distribution chart, and setting any one section or two or more sections selected among sections other than the set peak average section as a peak detection section. The method also includes a second information collecting step (S40) of arranging the distribution probability values for the peak detection section of the first distribution chart repeatedly collected in the first information collecting step (S10), the first distribution chart constructing step (S20), and the first section setting step (S30) according to the flow of the time, and connecting the arranged distribution probability values of the peak detection section to each other by straight lines, and then collecting peak slope information through slopes of the straight lines. The method also includes a threshold value setting step (S50) of setting a threshold value of a peak slope for the peak detection section. The method also includes a detecting step (S60) of arranging the distribution probability values for the peak detection section of the first distribution chart repeatedly collected in the real-time driving state of the equipment and connecting the arranged distribution probability values of the peak detection section to each other by the straight lines to measure a peak slope value, and when the measured peak slope value exceeds the threshold value of the peak slope, inducing an inspection and management of the equipment by warning, and the peak unit time is set as a time including two or more working processes.

A method for predictive maintenance of equipment via a distribution chart according to an embodiment of the present disclosure is described in detail with reference to the accompanying drawings. The detailed description of publicly-known function and configuration that may make the gist of the present disclosure unnecessarily ambiguous has been omitted.

FIGS. 1-11 illustrate a method for predictive maintenance of equipment via a distribution chart according to an embodiment of the present disclosure. FIG. 1 is a block diagram of a method for predictive maintenance of equipment via a distribution chart according to an embodiment of the present disclosure. FIGS. 2-11 are diagrams for describing the method for predictive maintenance of equipment via a distribution chart illustrated in FIG. 1.

As illustrated in the figure, the method 100 for predictive maintenance of equipment via a distribution chart according to an embodiment of the present disclosure includes an information collecting step (S10), a first distribution chart constructing step (S20), a first section setting step (S30), a second information collecting step (S40), a threshold value setting step (S50), and a detecting step (S60).

The information collecting step (S10) is a step of measuring information in which the amount of energy required for the equipment to perform one working process in a normal driving state is changed according to the flow of time, and setting and collecting a value having a largest amount of energy as a peak value in the change information of the measured amount of energy.

In general, the equipment that is installed in large facilities and operates organically performs a specific working process repeatedly, and in this case, as the energy required for the equipment, current (power), a frequency of supplied power, vibration, noise, etc., generated from the equipment, etc., may be selectively used.

Figure 2:
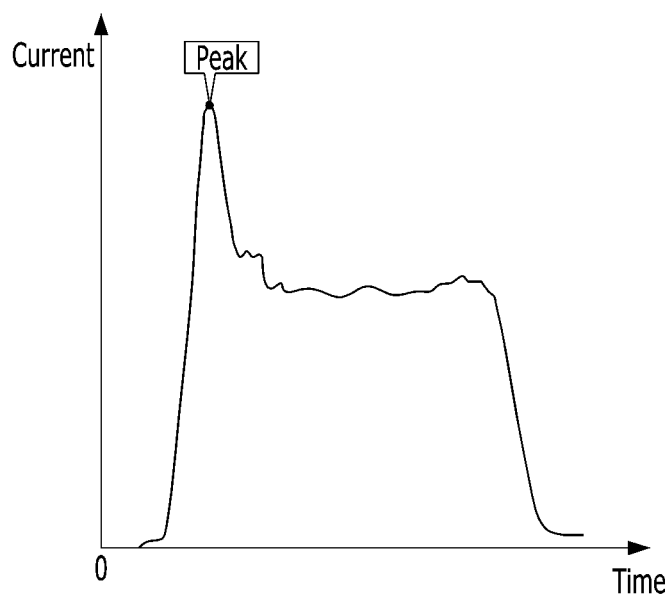

For example, when as the energy required for equipment such as a perforator that performs a working process of perforating a hole in a material to perform the working process, current supplied to the equipment is represented according to the flow of the time, a waveform illustrated in FIG. 2 is illustrated.

In this case, a value of current which is the largest is set as a peak value, and the peak value is collected in the first information collecting step (S10).

The first distribution chart constructing step (S20) is a step of collecting all peak values for respective working processes repeatedly performed in the equipment based on the information collected in the information collecting step (S10), constructing a first distribution chart based on the collected peak value, and repeatedly constructing the first distribution chart for an operation repeatedly performed in the equipment at a set peak unit time interval.

Figure 3:
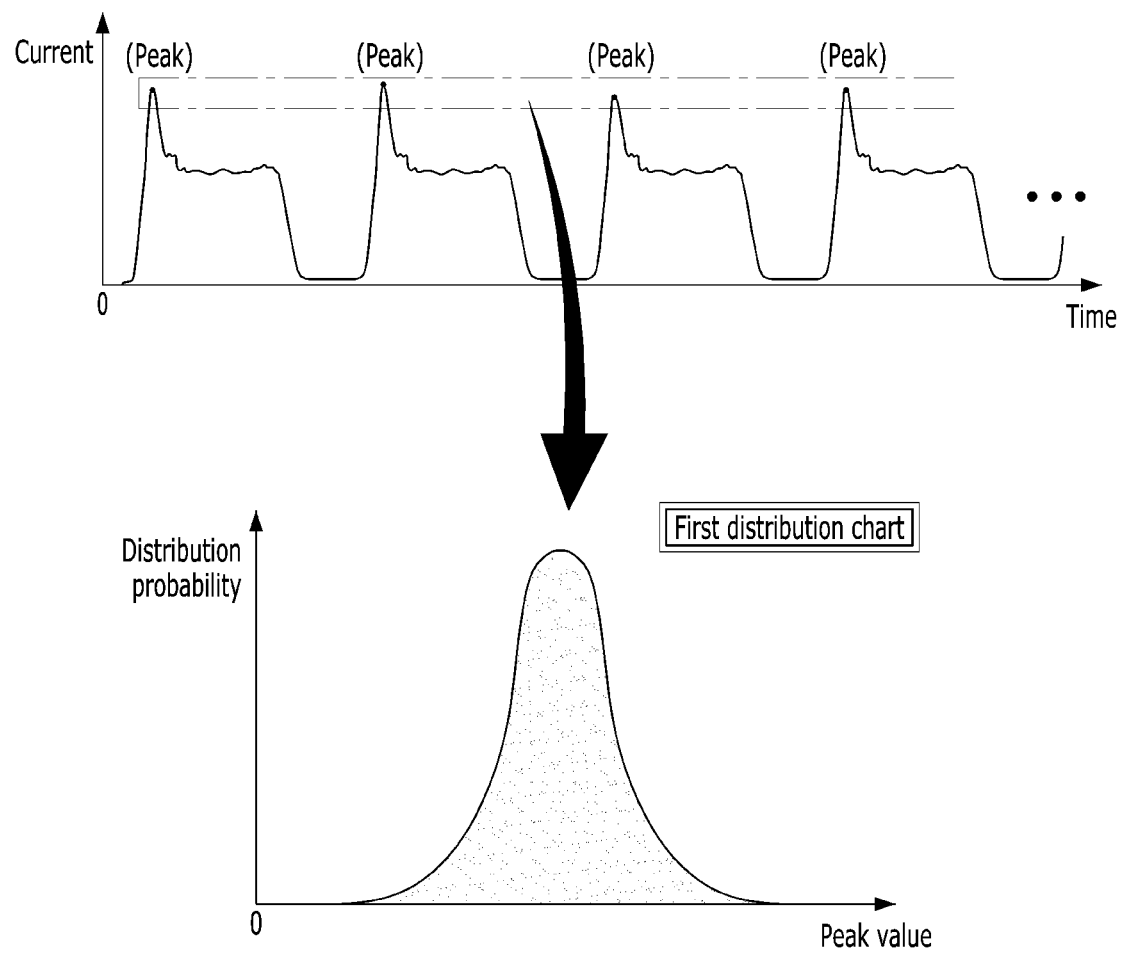

In other words, when the equipment repeatedly performs the working process, the peak value may be repeatedly collected as illustrated in FIG. 3, and the first distribution chart illustrated in FIG. 3 may be constructed based on multiple collected peak values.

Here, the peak unit time as a time set to include two or more peak values may be set to units including at least several seconds to at most a day, a month, a year, etc., by considering a driving condition, a surrounding environment, etc., of the equipment.

The first section setting step (S30) is a step of arbitrarily setting a section in which a distribution probability of the peak value is high as a peak average section in the first distribution chart, and setting any one section or two or more sections selected among sections other than the set peak average section as a peak detection section.

Here, a peak value in which the distribution probability is high in the normal state of the equipment may be regarded as a value in which the state of the equipment is somewhat stable, and a peak value in which the distribution probability is low, i.e., a value in which the peak value is formed to be too large or on the contrary, the peak value is formed to be too small may be regarded as a value in which the state of the equipment is somewhat unstable.

Figure 4:
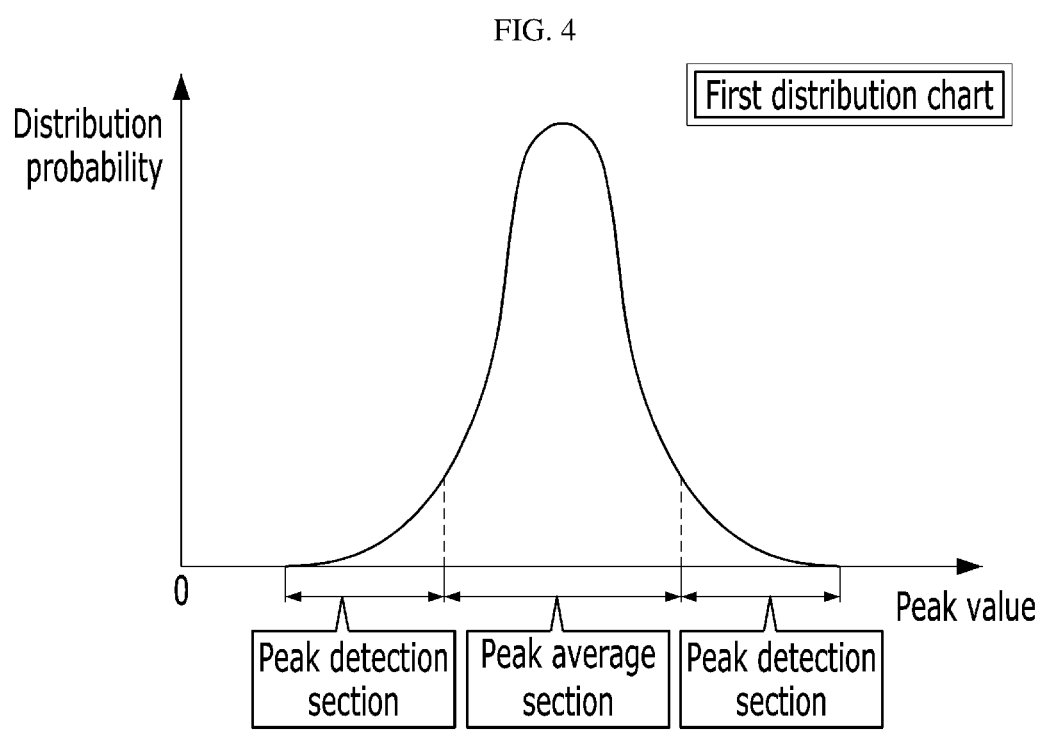

Accordingly, as illustrated in FIG. 4, when the first distribution chart is partitioned into the peak average section and the peak detection section, the peak average section is an area where the peak value in which the equipment is in a stable state is distributed and the peak detection section is an area where the peak value in which the equipment is in a somewhat unstable state is distributed.

Here, as the peak detection section, all sections other than the peak average section, i.e., both sections of the peak average section are selected as the peak detection section, but only the selected section is not selected as the peak detection section.

The second information collecting step (S40) is a step of arranging the distribution probability values for the peak detection section of the first distribution chart repeatedly collected in the first information collecting step (S10), the first distribution chart constructing step (S20), and the first section setting step (S30) according to the flow of the time, connecting the arranged distribution probability values of the peak detection section to each other by straight lines, and then collecting peak slope information through slopes of the straight lines.

Figure 5:
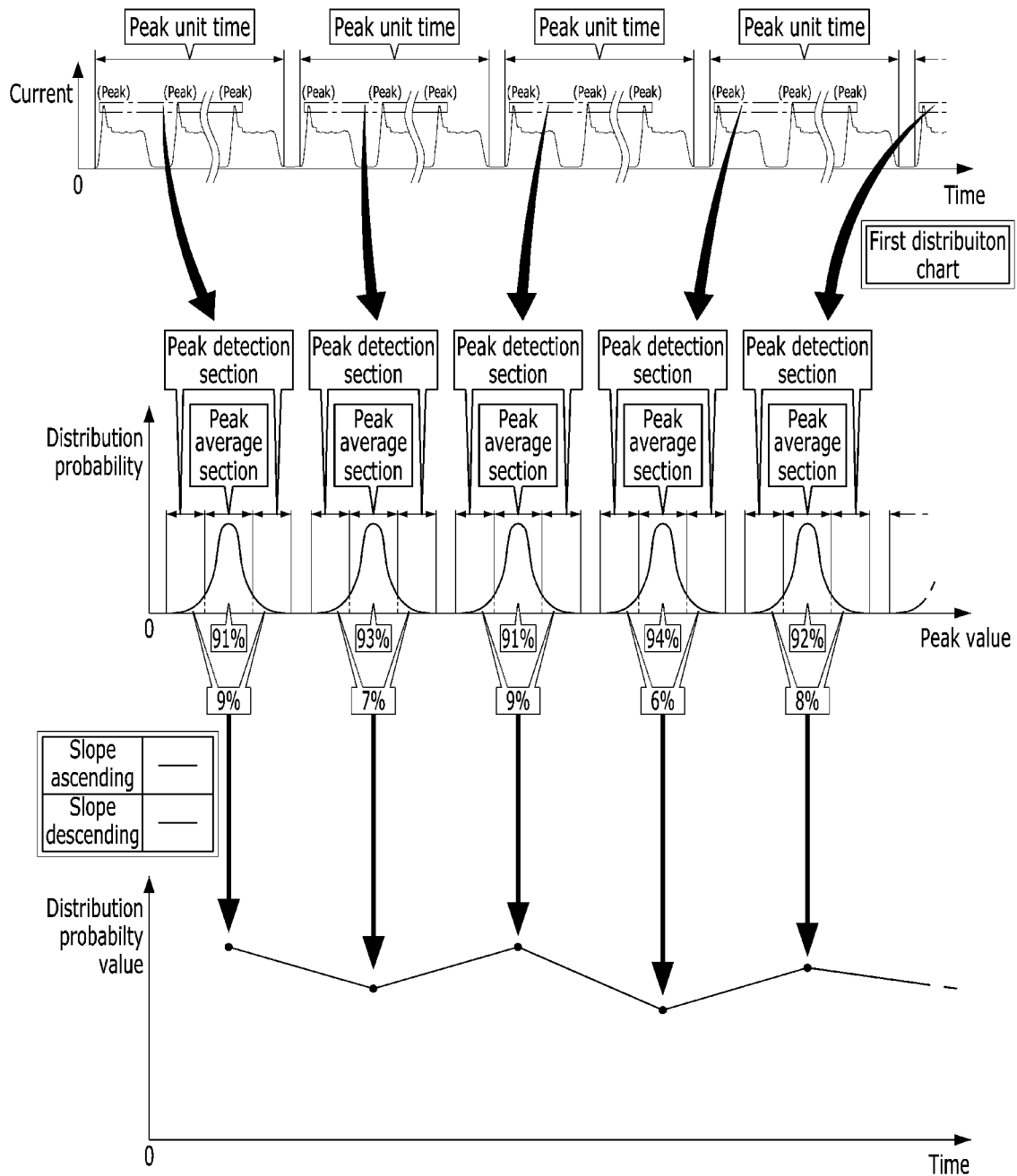

In other words, when the first distribution chart is repeatedly constructed and collected, the distribution probability values for multiple peak detection sections are collected as illustrated in FIG. 5, and when the collected distribution probability values of the peak detection sections are arranged according to the flow of the time, and then connected by the straight lines, the connected distribution probability values may be represented as in FIG. 5.

In this case, slope values of the straight lines connecting the distribution probability values of the peak detection sections may be divided into an ascending slope value (positive number) in which a slope ascends and a descending slope value (negative number) in which the slope descends, but all slope values are digitized and collected to absolute values.

Here, the peak unit time as a time set to include distribution probability values of peak detection sections of two or more first distribution charts may be set to units including at least several seconds to at most a day, a month, a year, etc., by considering a driving condition, a surrounding environment, etc., of the equipment, of course.

The threshold value setting step (S50) is a step of setting a threshold value of a peak slope for the peak detection section.

Here, the peak slope threshold value as a value for warning when the slope value of the straight line connecting the distribution probability value of the peak detection section and the distribution probability value of the other peak detection section partitioned in the first distribution chart is abnormally increased may be set to values having various sizes by considering the type of equipment, a use environment, a life-span, a size (distribution probability) of the peak detection section, and the like. The peak slope threshold value is divided and set into two or more threshold values, e.g., a warning threshold value, a risk threshold value, etc., to variously form levels for the warning. Thus, the abnormal symptom of the equipment may be warned.

The detecting step (S60) is a step of arranging the distribution probability values for the peak detection section of the first distribution chart repeatedly collected in the real-time driving state of the equipment and connecting the arranged distribution probability values of the peak detection section to each other by the straight lines to measure a peak slope value, and when the measured peak slope value exceeds the threshold value of the peak slope, inducing an inspection and management of the equipment by warning.

Figure 6:
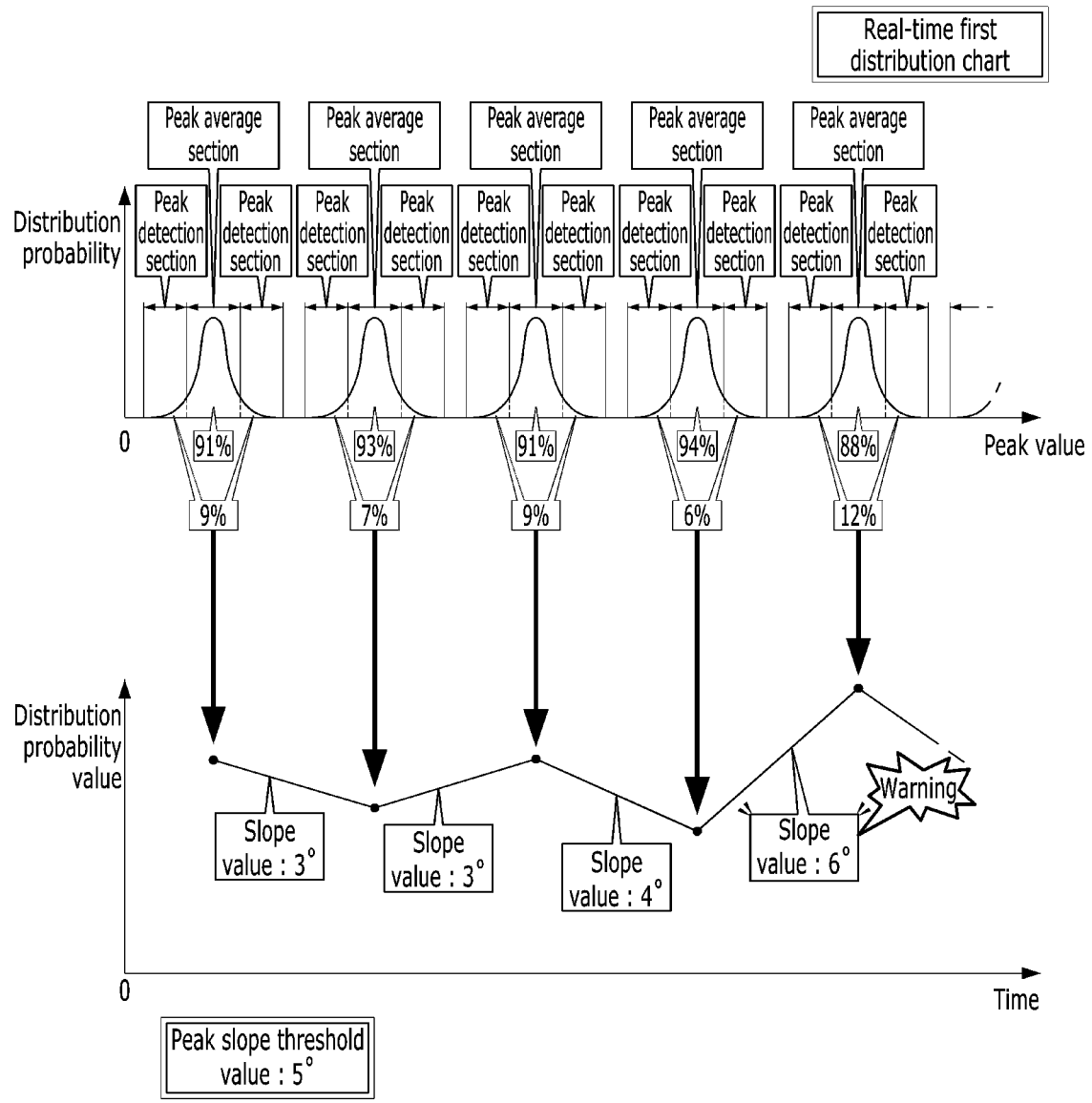

In other words, the real-time first distribution chart is constructed based on the peak value for the working process within the peak unit time in the real-time driving state of the equipment as illustrated in FIG. 6. By a scheme in which the real-time first distribution chart is repeatedly constructed at the repeated peak unit time interval, and the distribution probability values for the peak detection sections of the real-time first distribution chart constructed in this case are arranged according to the flow of the time and when the peak slope value acquired by connecting the distribution probability values of the arranged peak detection sections to each other by the straight lines does not exceed the peak slope threshold value, it is detected that the equipment is in the very stable state. When the peak slope value exceeds the peak slope threshold value, it is detected and warned that the equipment is in the somewhat unstable state, the abnormal symptom of the equipment is detected before the failure of the equipment occurs to induce the inspection and management of the equipment. Thus, prevention of economic losses, which may be generated as overall actuation of facilities is stopped due to a sudden failure of the equipment, may be induced.

For example, in FIG. 6, the peak slope threshold value is set to 5°, and the slope value of the straight line connecting the distribution probability values of the peak detection sections of the real-time first distribution chart of the equipment is compared with the set peak slope threshold value to compare and detect the abnormal symptom of the equipment.

Figure 7:
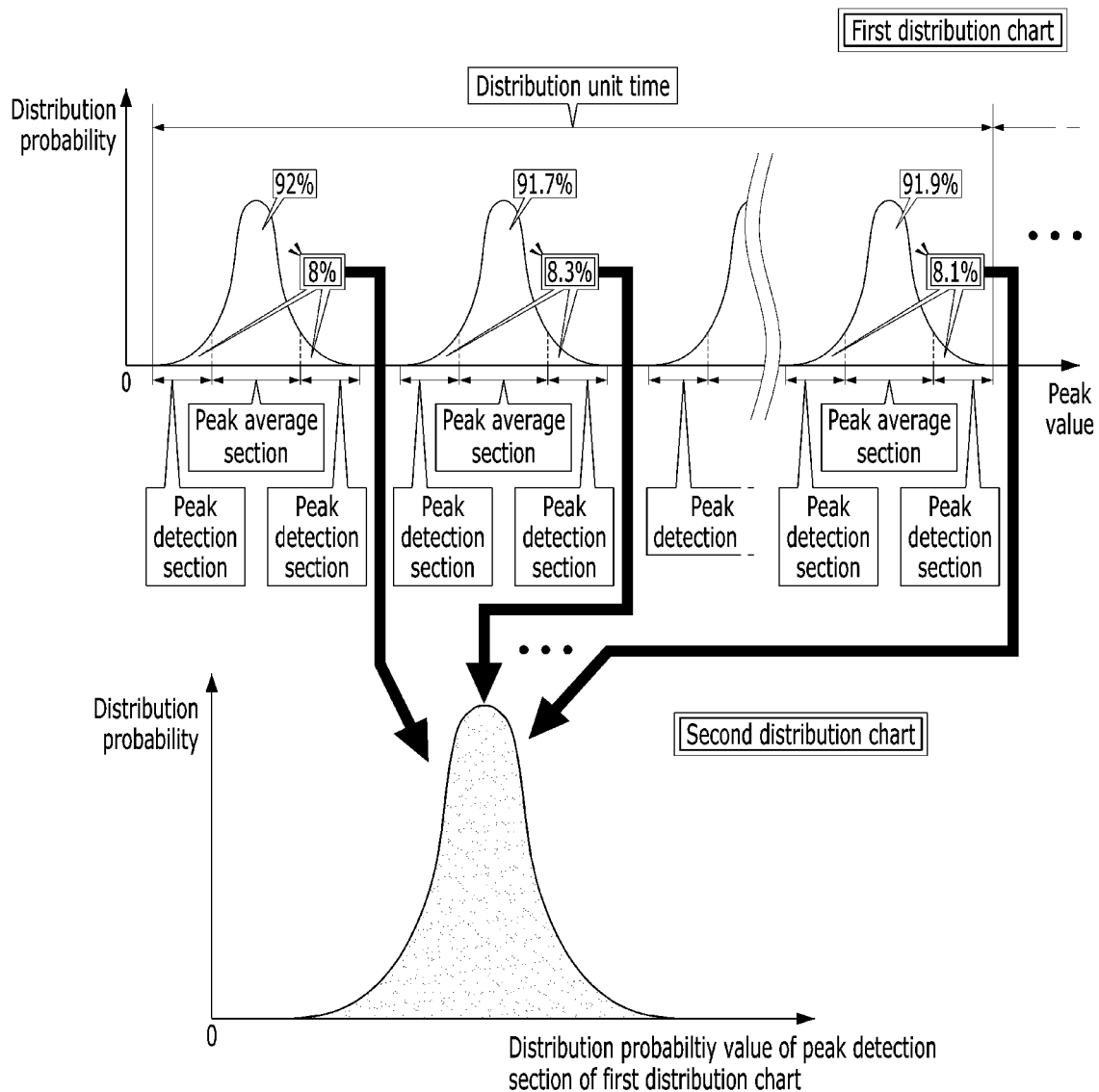
Figure 8:
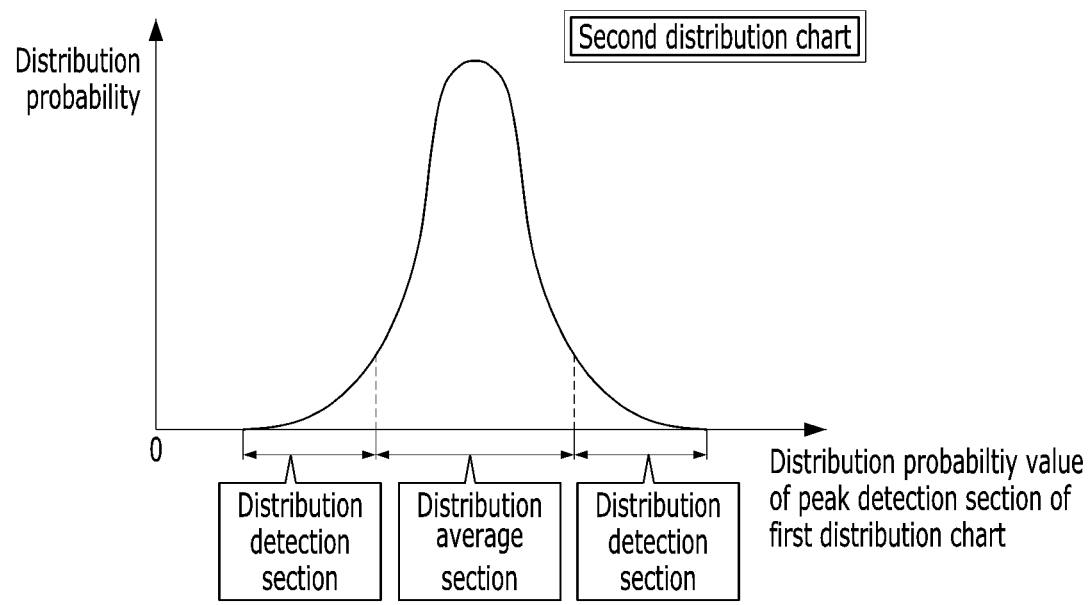

Meanwhile, the method further includes a second distribution chart constructing step (S70). In this step, as illustrated in FIG. 7, all of the distribution probabilities for the peak detection section of the first distribution chart repeatedly collected through the information collecting step (S10), the first distribution chart constructing step (S20), and the first section setting step (S30) are collected and a second distribution chart for the collected distribution probability values of the peak detection section is constructed. The second distribution chart for the peak detection section of the first distribution chart repeatedly constructed at the set distribution unit time interval is repeatedly constructed. The method further includes a second section setting step (S80). In this step, as illustrated in FIG. 8, a section in which the distribution probability of the distribution probability value of the peak detection section is high is arbitrarily set as a distribution average section in the second distribution chart, and any one section or two or more sections selected among sections other than the set distribution average section are set as a distribution detection section.

Here, the distribution unit time as a time set to include two or more distribution probability values of the peak detection section of the first distribution chart may be, of course, set to units such as at least several seconds to at most a day, a month, a year, etc., by considering a driving condition of the equipment, a surrounding environment, etc. The second distribution chart is constructed by a value in which the state of the equipment corresponding to the peak detection section is somewhat unstable in the first distribution chart. In this case, the distribution detection section of the second distribution chart may be regarded as a section in which values in which the state of the equipment is further unstable are distributed.

Then, the threshold value of the distribution slope for the distribution detection section is set in the threshold value setting step (S50). In this case, the distribution slope threshold value as a value for warning when the slope value of the straight line connecting the distribution probability values of the distribution detection sections partitioned in the second distribution chart is increased may be set to values having various sizes by considering the type of equipment, the use environment, the life-span, a size (distribution probability) of the distribution detection section, and the like.

Figure 9:
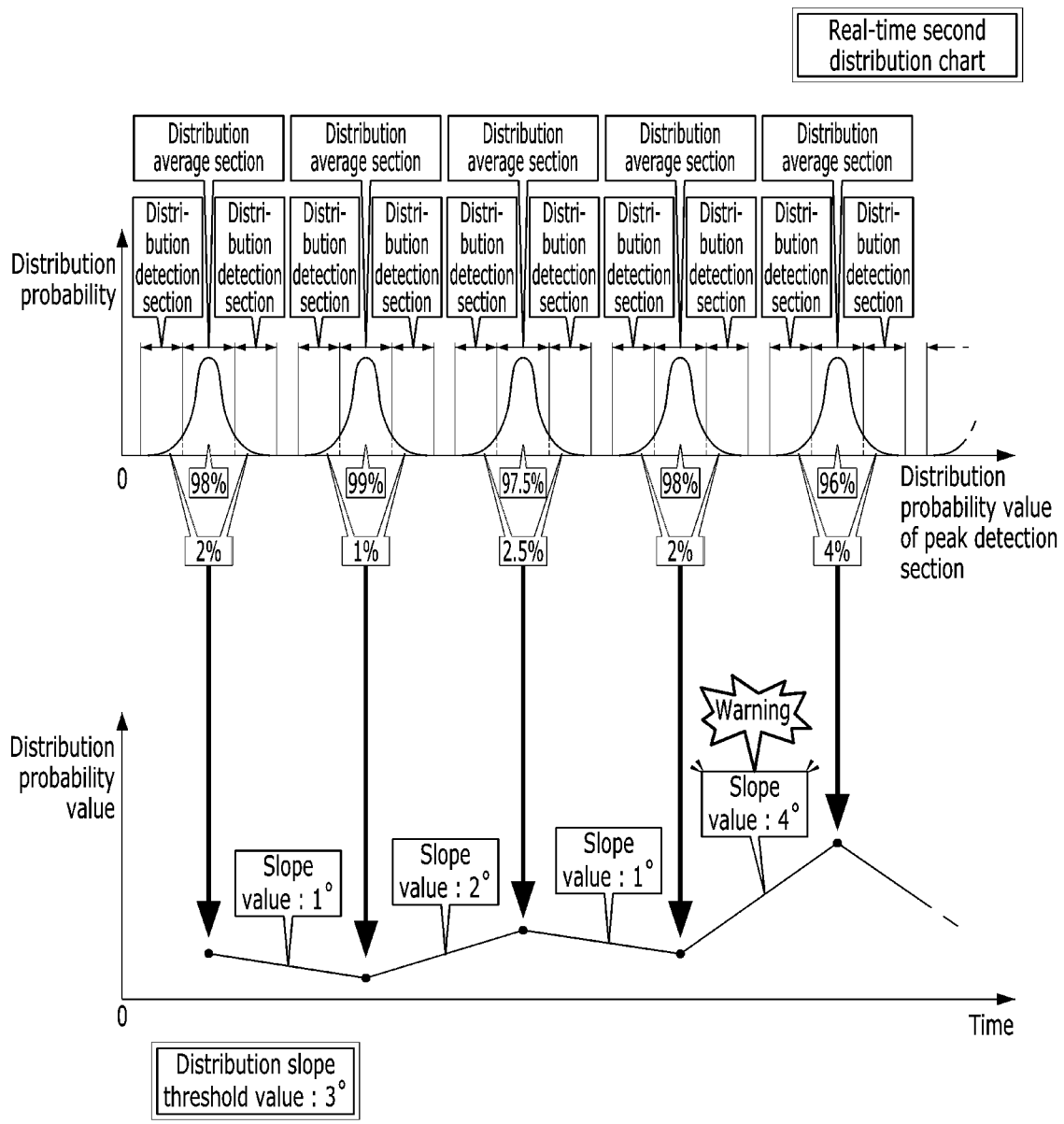

Then, as illustrated in FIG. 9, in the detecting step (S60), the distribution probability values for the distribution detection section of the second distribution chart repeatedly collected in the real-time driving state of the equipment are arranged according to the flow of the time. The arranged distribution probability values of the distribution detection section are connected to each other by the straight line to measure the distribution slope value. When the measured distribution slope value exceeds the threshold value of the distribution slope, the inspection and management of the equipment are induced by warning.

For example, in FIG. 9, the distribution slope threshold value is set to 3°, and the slope value of the straight line connecting the distribution probability values of the distribution detection sections of the real-time second distribution chart of the equipment is compared with the set distribution slope threshold value to compare and detect the abnormal symptom of the equipment.

Figure 10:
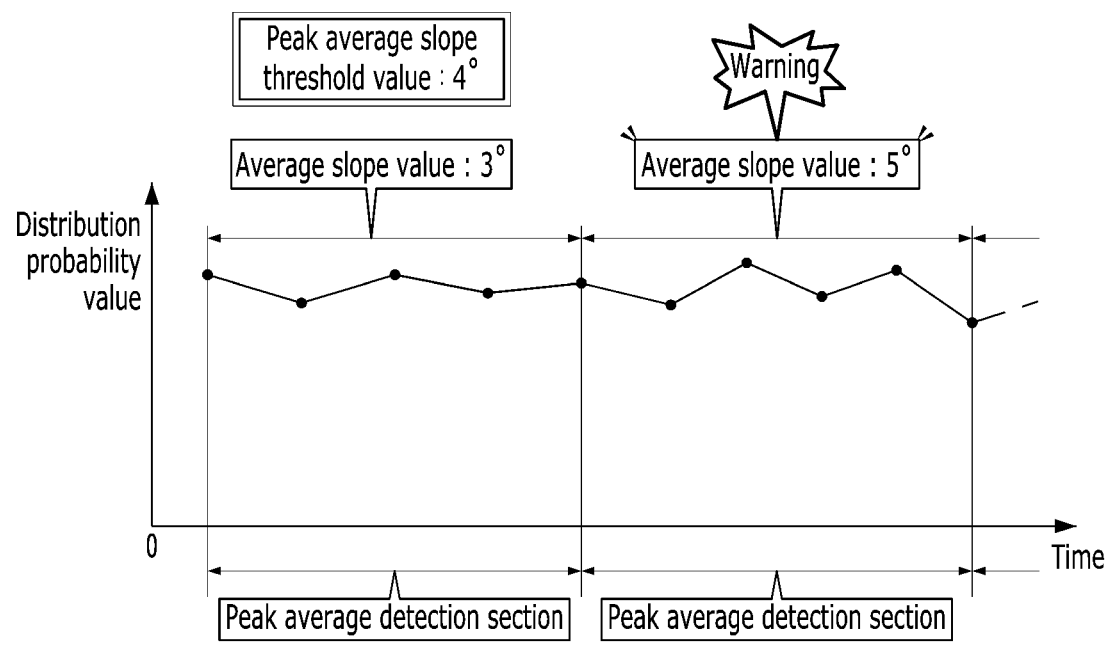
Figure 11:
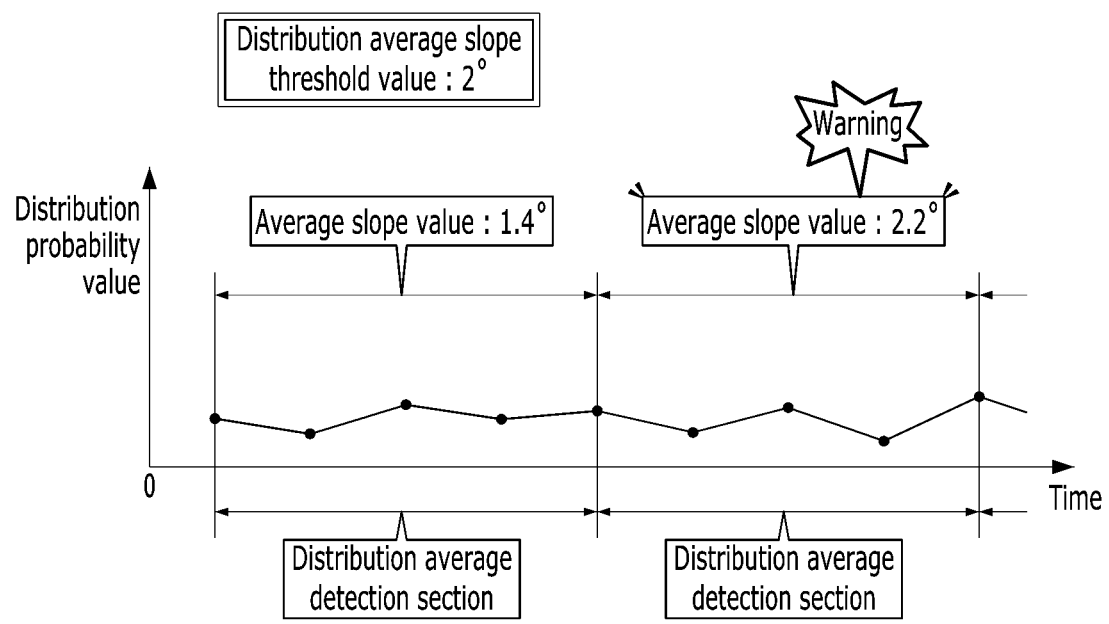

Further, in the threshold value setting step (S50), each of a threshold value of a peak average slope for the peak detection section and a threshold value of a distribution average slope for the distribution detection section is set. As illustrated in FIG. 10, in the detecting step (S60), when a peak average detection section including the peak slope value for the peak detection section twice or more in the real-time driving state of the equipment is set, the respective peak slope values included in the set peak average detection section are collected, and the averaged peak average slope value exceeds the threshold value of the peak average slope. Alternatively, as illustrated in FIG. 11, when a distribution average detection section including the distribution slope value for the distribution detection section twice or more in the real-time driving state of the equipment is set, the respective distribution slope values included in the set distribution average detection section are collected, and the averaged distribution average slope value exceeds the threshold value of the distribution average slope, the inspection and management of the equipment are induced by warning.

In other words, since the method 100 for predictive maintenance of equipment via a distribution chart according to the present disclosure may more accurately and precisely detect and predict the abnormal symptom of the equipment through the peak slope threshold value for the distribution probability of the peak detection section, the distribution slope threshold value for the distribution detection section, the threshold value of the peak average slope, and the threshold value of the distribution average slope.

The method 100 for predictive maintenance of equipment via a distribution chart according to the present disclosure predicts the abnormal symptom of the equipment. By such a process, the method 100 has an effect that a peak value is extracted based on a change in the amount of energy required for the equipment to perform a working process in a normal state; the distribution chart is constructed based on the extracted peak value; and abnormalities of the equipment are predictively detected in advance based on a change in a distribution probability of a detection section having a low distribution probability and a somewhat high risk in the constructed distribution chart, so as to induce maintenance and replacement of the equipment to be carried out in a timely manner. Thus, enormous financial losses due to equipment failure may be prevented.

Further, there is an effect that various detection conditions are presented to efficiently search for an abnormal symptom which occurs in the equipment and the equipment in an abnormal state is detected when the detection condition is satisfied, thereby precisely and effectively detecting the abnormal symptom which occurs in the equipment and securing excellent reliability for a detection result.

The present disclosure has been described with reference to the embodiment illustrated in the accompanying drawings and is just exemplary and is not limited to the above-described embodiments. It should be appreciated by those having ordinary skill in the art that various modifications and embodiments equivalent thereto can be made therefrom. In addition, modifications by those having ordinary skill in the art can be made without departing from the scope of the present disclosure. Therefore, the scope of the claims in the present disclosure should not be defined within the scope of the detailed description but should be defined by the following claims and the technical spirit thereof.

The invention claimed is:

1. A method for predictive maintenance of equipment via a distribution chart, the method comprising:
    monitoring, by a sensor, a real-time driving state of an equipment while the equipment is repeatedly performing a working process;
    measuring, by a processor, a change in an amount of energy required for the equipment to perform the working process in a normal driving state, wherein the amount of energy is changed while the equipment is repeatedly performing the working process in the normal driving state;
    setting, by the processor, a value having a largest amount of energy as a peak value based on the measured change in the amount of energy;
    collecting, by the processor, all peak values for the working process repeatedly performed by the equipment based on the measured change in the amount of energy;
    constructing, by the processor, a first distribution chart based on the collected all peak values and repeatedly constructing, by the processor, first distribution charts for the working process repeatedly performed by the equipment at a set peak unit time interval while the equipment is repeatedly performing the working process in the normal driving state;
    setting, by the processor, a section having a high distribution probability of the peak value as a peak average section in each of the first distribution charts and setting, by the processor, at least one section selected among sections other than the peak average section as at least one peak detection section in each of the first distribution charts;
    repeatedly determining, by the processor, a distribution probability value for the at least one peak detection section in each of the first distribution charts while the equipment is repeatedly performing the working process in the normal driving state;
    arranging, by the processor, the distribution probability values in order of time during which the equipment is repeatedly performing the working process in the normal driving state;
    connecting, by the processor, the distribution probability values of the peak detection sections to each other by straight lines and determining a peak slope of each of the straight lines;
    setting, by the processor, a peak slope threshold value for the peak detection sections based on the peak slope of each of the straight lines;
    repeatedly determining, by the processor, a distribution probability value for the at least one peak detection section in each of the first distribution charts while the equipment is repeatedly performing the working process in the real-time driving state of the equipment;
    arranging, by the processor, the distribution probability values in order of time during which the equipment is repeatedly performing the working process in the real-time driving state of the equipment;
    connecting, by the processor, the distribution probability values of the peak detection sections to each other by the straight lines and measuring a peak slope value of each of the straight lines; and
    when the measured peak slope value exceeds the peak slope threshold value, inducing, by the processor, an inspection and management of the equipment by warning,
    wherein the set peak unit time interval is a time duration for the equipment to perform the working process for two or more times.

2. The method of claim 1, further comprising:
    constructing, by the processor, a second distribution chart based on all of the distribution probability values for the peak detection sections in the first distribution charts and repeatedly constructing second distribution charts for the peak detection sections in the first distribution charts at a set distribution unit time interval while the equipment is repeatedly performing the working process in the normal driving state; and
    setting, by the processor, a section a high distribution probability of the distribution probability value of the peak detection section as a distribution average section in each of the second distribution charts and setting at least one section selected among sections other than the distribution average section are set as at least one distribution detection section in each of the second distribution charts, setting, by the processor, a distribution slope threshold value for the distribution detection sections, and repeatedly determining, by the processor, a distribution probability value for the at least one distribution detection section in each of the second distribution charts while the equipment is repeatedly performing the working process in the real-time driving state of the equipment;

arranging, by the processor, the distribution probability values in order of time during which the equipment is repeatedly performing the working process in the real-time driving state of the equipment;

connecting, by the processor, the distribution probability values of the distribution detection sections to each other by the straight lines and measuring a distribution slope value of each of the straight lines; and when the measured distribution slope value exceeds the distribution slope threshold value, inducing, by the processor, the inspection and management of the equipment by warning, and wherein the set distribution unit time interval is a time duration including two or more first distribution charts.

3. The method of claim 2, wherein setting the peak slope threshold value for the peak detection sections comprises setting a peak average slope threshold value for the peak detection sections and setting the distribution slope threshold value for the distribution detection sections comprises setting a distribution average slope threshold value for the distribution detection sections, and wherein the method further comprising:

setting, by the processor, a peak average detection section including based on a plurality of peak slope values for the peak detection section determined while the equipment is repeatedly performing the working process in the real-time driving state of the equipment and inducing, by the processor, the inspection and management of the equipment by warning when a peak average slope value of the plurality of peak slope values exceeds the peak average slope threshold value, or setting, by the processor, a distribution average detection section including a plurality of distribution slope values for the distribution detection section determined while the equipment is repeatedly performing the working process in the real-time driving state of the equipment and inducing, by the processor, the inspection and management of the equipment by warning when a distribution average slope value of the plurality of distribution slope values exceeds the distribution average slope threshold value.

* * * * *